(No Model.) 2 Sheets—Sheet 1.
F. H. VAN HOUTEN.
MACHINE FOR FORMING GEOMETRICAL FIGURES ON SPHERICAL OR CURVILINEAR BODIES.
No. 460,168. Patented Sept. 29, 1891.
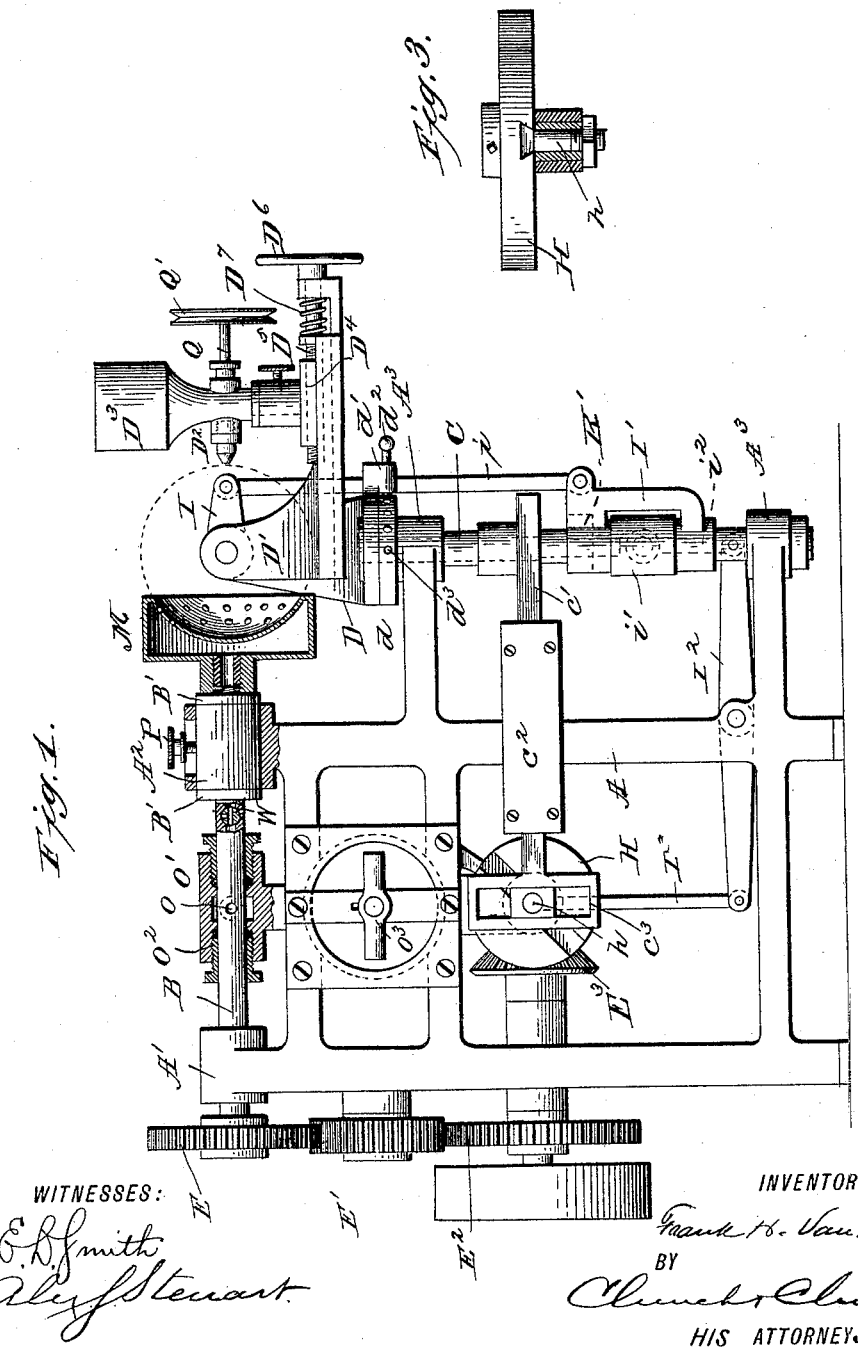
WITNESSES:
INVENTOR
Frank H. Van Houten
BY
Church & Church
HIS ATTORNEYS (No Model.) 2 Sheets—Sheet 2.
F. H. VAN HOUTEN.
MACHINE FOR FORMING GEOMETRICAL FIGURES ON SPHERICAL OR CURVILINEAR BODIES.
No. 460,168. Patented Sept. 29, 1891.
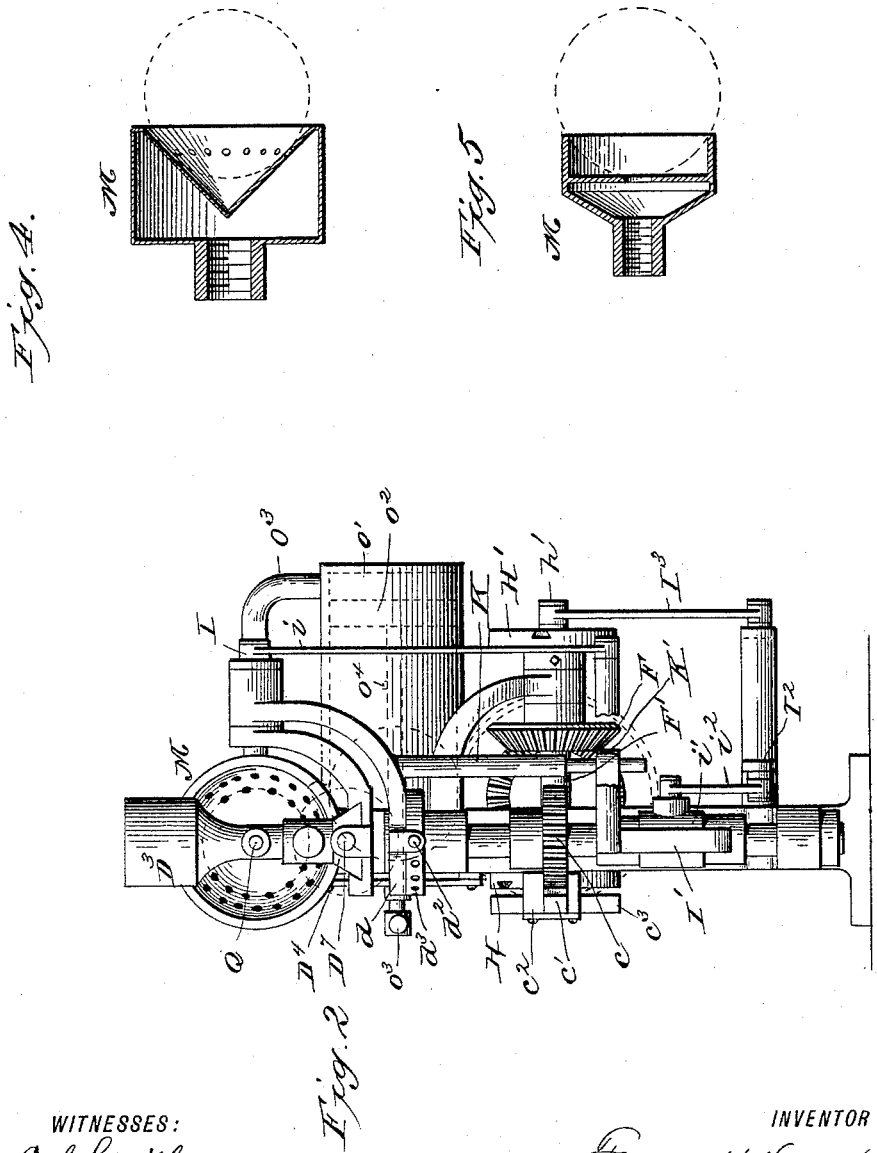
WITNESSES:
INVENTOR
Frank H. Van Houten
BY
Church & Church
HIS ATTORNEYS

United States Patent Office.

FRANK H. VAN HOUTEN, OF MATTEAWAN, NEW YORK.

MACHINE FOR FORMING GEOMETRICAL FIGURES ON SPHERICAL OR CURVILINEAR BODIES.

SPECIFICATION forming part of Letters Patent No. 460,168, dated September 29, 1891.

Application filed December 19, 1890. Serial No. 375,232. (No model.)

*To all whom it may concern:*

Be it known that I, FRANK H. VAN HOUTEN, of Matteawan, in the county of Dutchess and State of New York, have invented certain new and useful Improvements in Machines for Forming Geometrical Figures on Spherical or Curvilinear Bodies; and I do hereby declare the following to be a full, clear, and exact description of the same, reference being had to the accompanying drawings, forming a part of this specification, and to the letters of reference marked thereon.

This invention has for its object to provide a machine for painting, tracing, or otherwise forming geometrical figures on spherical or curvilinear bodies, and particularly upon the surface of rubber balls and similar light elastic bodies; and it may be said to consist, broadly, in a chuck or carrier for the work or sphere, with means for rotating the same, and a tracing, painting, or ornamenting tool or point mounted on a carriage and having a curvilinear movement in any direction coincident with the surface to be ornamented, said point being moved with definite relation to the movement of the surface of the sphere.

The invention further consists in certain novel details of construction and combinations and arrangements of parts, to be hereinafter described, and pointed out particularly in the claims at the end of this specification.

Referring to the accompanying drawings, Figure 1 is a front elevation of a machine constructed in accordance with my invention, portions being shown broken away and in section. Fig. 2 is a similar view, looking at the right-hand end of the machine. Fig. 3 is a detail of one of the adjustable crank-pins and disk. Figs. 4 and 5 are sectional views of modified forms of chucks.

Similar letters of reference in the several figures indicate the same parts.

The essential features of the machine as shown in the drawings consist of a work holder or center upon which the work rotates, an ornamenting-tool, and pivotal centers carrying the same located in such relation to each other that the tool will follow the contour of the work in any direction and preferably so that projections of the last-mentioned centers will intersect at an angle, the intersecting point being coincident with the axis of the work or center of the sphere to be operated upon.

The frame A of the machine is of any construction found best suited to the style of the machine desired, and at the top carries in suitable bearings $A'$ $A^2$ a lathe or chuck-shaft B, held against longitudinal movement by the collars $B'$, provided with a chuck, to be hereinafter particularly described, adapted to receive and hold the sphere. Besides the horizontal shaft B the frame carries a vertical shaft C, journaled in bearings $A^3$, preferably arranged in a line intersecting a projection of the shaft B at substantially right angles.

Mounted on the upper end of the shaft C is a yoke D, having horizontal bearings in a line intersecting the point aforesaid, and in these bearings is journaled the ornamenting-tool or point-carrier $D'$. The tool or point itself consists in the present instance of a tube $D^2$, through which paint is fed from a reservoir $D^3$, said reservoir and point being mounted in a socket on a carriage $D^4$, sliding in ways on the carrier $D'$ and held in adjusted position by the screw $D^5$, hand-wheel $D^6$, and spring $D^7$, so as to permit of an adjustment for operating upon spheres of different size, the corresponding adjustment of the sphere being preferably secured by employing large or small chucks.

Assuming that a ball is held by the chuck, as indicated in dotted lines, and rotated at any speed, it is obvious that figures of various forms can be produced by moving the point on either of its centers without moving it on the other, and the figures may be infinitely varied by giving the point a compound movement on both centers; but in order to form true geometrical figures all the movements must bear a certain relation to each other, and to obtain this result the vertical and horizontal movements of the point are secured by adjustable cranks or equivalents connected thereto and in gear with the chuck-shaft.

At the left of the frame A are located gear-wheels E $E'$ $E^2$, the former on the chuck-shaft and the latter connected therewith through the gear $E'$ and mounted on a shaft carrying at the inner end a bevel-gear $E^3$, meshing with a similar gear F on a cross-shaft $F'$, carrying at opposite ends the disks H H', with the crank-pins $h$ $h'$ adjustable around the shaft with relation to each other for moving the point as aforesaid. Pin $h$, for rotating the vertical shaft to vary the position of the point horizontally, engages the shaft through the medium of the gear $c$, rack-bar $c'$, sliding in a bearing $c^2$ and connected with the pin through the medium of the slot-frame $c^3$. Pin $h'$ is connected to the point-carrier or vertically-swinging frame by means of the crank-arm I on said frame, the link $i$, connected thereto and to the double collar-frame I' on the shaft C. The frame I' is moved by the intermediate collar $i'$, link $i^2$, pivoted lever I$^2$, and connecting-rod I$^3$.

To insure the turning of the frame I' with the shaft C to prevent binding, a rigid rod K extends down from the yoke D and passes through an aperture in an arm K' on the said frame I'. (See Fig. 2.)

The result of the construction just described is that the parts are moved with certain definite relation to each other, and the figure formed by the tool may be infinitely varied by changing the relative speed and extent of movement in each direction, which may be accomplished by adjusting the crank-pins with relation to the center of the disk, the construction of pin and disk shown in Fig. 3 permitting of such adjustment without difficulty, and when the geometrical figure only requires a movement in one direction the opposite pin may be placed at the center of the disk, as shown in the drawings.

Should it be desired to change the position of the point to operate on the side of the ball with relation to the chuck or at any intermediate point, it may be accomplished by changing the relation of the shaft C and yoke D, the parts being provided with abutting disks $d$ and held in relative position by means of the projection $d'$ and spring pin or screw $d^2$, adapted to engage any one of the series of holes $d^3$, located throughout ninety degrees or more of the circumference of the lower disk.

While any chuck which will hold the sphere securely may be employed in connection with the mechanisms heretofore described, I have designed one which is peculiarly adapted for holding the light rubber balls and similar articles to be operated upon by this machine, which relies for its holding power upon atmospheric pressure, the idea being to place the sphere against a seat, from which it is prevented from separating by the creation of a vacuum behind the same. The simplest and most effective form of chuck for accomplishing this end consists of a head M, adapted to screw on the end of the chuck-shaft and provided with a seat for the ball, with a vacuum-chamber at the back of the seat for holding the ball in place. The form of the seat may be modified as desired or to suit the work, as shown, for instance, in Figs. 4 and 5, and in order to secure and maintain the proper suction on the ball I form the chuck hollow, with openings into the seat back of its edge, preferably a number of small openings, and exhaust the air from the chuck by means of a suitable air-pump. In the construction shown the shaft is made hollow for a portion of its length, and at a suitable point lateral openings O are formed, around which is fitted a box O', having packing-glands O$^2$ at the ends to prevent the entrance of air, and with which box the air-pump is put in communication through the pipe O$^3$.

The air-pump is of the simplest character, and consists of cylinder $o'$, having a tight-fitting piston $o^2$, provided with a rod, and a handle $o^3$, projecting at the front of the machine in convenient position to be grasped by the operator and drawn out as a sphere, is placed in position with the other hand. When drawn out, the vacuum is maintained by giving the rod a partial turn, causing the pin $o^4$ to engage the wall of the guide at the front of the cylinder and hold the piston out.

Should it be desired, other kinds of air-pump may be employed, and where a number of machines are used a single air-pump may be connected to all of them through the pipes in communication with the chuck-shafts, and to enable any one to be cut out without affecting the others stop-cocks may be located at any points in the connections, preferably, however, in the chuck-shaft itself, as shown at W, in order that a vacuum may be maintained in the chuck without danger of leakage through the joints of the connections.

To adapt the machine for forming perfect figures on different-sized balls, I prefer to provide different chucks for each size of ball, in order that the center of the balls may always be exactly at the point where projections of the pivots of the ornamenting-point would intersect, the ornamenting-point being thereby caused to travel over the surface of the ball in true geometrical lines. Any wear on the chuck-shaft or the thrust-collars thereof may be taken up by moving the sleeve A$^2$ along and clamping it in the bearing in the frame by means of the set-screw and washer P, as will be readily understood, and it will be noted that, if desired, the shaft may be thus adjusted to adapt it for different-sized balls; but the preferred manner of providing for them is as aforesaid.

In operating the machine it is only necessary to set the crank-pins to form the desired figure. Then place a ball in position, draw out the piston to create a vacuum and clamp the ball, then start the machine, the balance of the manipulation being carried on automatically. The operator may place the ball in position and watch the formation of the ornamentation with the greatest facility, owing to the fact that all the framing is carried to the rear, as shown in Fig. 2. Therefore nothing but the point itself and its immediate connections can interrupt the view or interfere with the placing of the ball in position or removing the same.

When desired, the cup or reservoir containing the coloring-matter or paint may be removed from its socket in the carriage for cleaning or the substitution of cups containing other colors, &c., and if found necessary a feeding-point or agitator Q may pass into the point from the rear and be driven through the medium of a small grooved wheel Q′, deriving its power from any suitable source through a belt or other well-known contrivance. The point itself may also be made separate from the cup or reservoir and simply screwed into the same, as shown, so as to be easily removed and cleaned or points of different size substituted, or in lieu of the point shown any desired tracing, graving, marking, or ornamenting tool may be substituted without departing from the invention in the least.

Having thus described my invention, what I claim as new is—

1. In a machine for ornamenting curvilinear surfaces, the combination, with a work-carrier and means for rotating the work, of an ornamenting-tool working on two centers and swinging thereon in arcs coincident with the contour of the work in planes respectively parallel and transverse to the axis of the work, substantially as described.

2. In a machine for ornamenting curvilinear surfaces, the combination, with a work-carrier and means for rotating the work, of an ornamenting-tool mounted in a carrier pivoted on centers projections of which intersect at an angle, substantially as described.

3. In a machine for ornamenting spherical surfaces, the combination, with a work-carrier and means for rotating the work, of an ornamenting-tool mounted in a carrier pivoted on two centers projections of which intersect each other at right angles, said intersecting point being at the center of the sphere or axis of the work, whereby the tool is caused to describe a true arc about the center of the sphere in any direction, substantially as described.

4. In a machine for ornamenting curvilinear surfaces, the combination, with the shaft carrying the chuck and the shaft journaled in bearings at an angle thereto, of the yoke carried by said last-mentioned shaft, the tool-carrier pivoted in said yoke at an angle to the shaft, and the tool held by the carrier, substantially as described.

5. In a machine for ornamenting curvilinear surfaces, the combination, with the shaft carrying the chuck and the shaft journaled in bearings at an angle thereto, of the yoke carried by said last-mentioned shaft, the tool-carrier pivoted in said yoke at an angle to the shaft, the tool, and a crank for rotating the yoke-shaft in gear with the chuck-shaft, substantially as described.

6. In a machine for ornamenting curvilinear surfaces, the combination, with the chuck-shaft and shaft journaled in bearings at an angle thereto, the yoke on the last-mentioned shaft, the tool-carrier pivoted thereon, and the tool, of the double-crank shaft in gear with the chuck-shaft and connections between one of said cranks and the yoke-shaft and between the opposite crank and the tool-carrier, whereby regular geometrical figures may be formed, substantially as described.

7. In a machine for ornamenting curvilinear surfaces, the combination, with the chuck-shaft and shaft journaled in bearings at an angle thereto, the yoke on the last-mentioned shaft, and the tool-carrier pivoted thereon, of the transverse shaft having the adjustable crank-pins connected, respectively, to the carrier and yoke-shaft, substantially as described.

8. In a machine for ornamenting curvilinear surfaces, the combination, with the horizontal chuck-shaft, shaft journaled in bearings at an angle thereto, yoke on said shaft, and tool-carrier pivoted in said yoke, of the transverse shaft in gear with the chuck-shaft, the crank-pin on said transverse shaft, the gear on the yoke-shaft, and the rack-bar driven by the crank and engaging said gear, substantially as described.

9. In a machine for ornamenting curvilinear surfaces, the combination, with the horizontal chuck-shaft, shaft journaled in bearings at an angle thereto, yoke on said shaft, and tool-carrier pivoted in said yoke, of the transverse shaft in gear with the chuck-shaft, the two adjustable crank-pins on said shaft, the gear and double collar-frame on the yoke-shaft, the rack-bar driven by one crank and engaging the gear, the pivoted lever-links and collar driven by the other crank and engaging the double collar-frame, and the link connecting the latter and the tool-carrier.

10. In a machine for ornamenting curvilinear surfaces, the combination, with the chuck-shaft, of the shaft journaled in bearings at an angle thereto, the yoke adjustably mounted on said last-mentioned shaft, and the tool-carrier pivoted in said yoke, substantially as described.

11. In a machine for ornamenting curvilinear surfaces, the combination, with the chuck-shaft, of the shaft journaled in bearings at an angle thereto and terminating in a disk, the yoke mounted thereon and adjustably connected thereto by the pin, as shown, and the tool-carrier pivoted in the yoke, substantially as described.

12. In a machine for ornamenting curvilinear surfaces, the combination, with the chuck-shaft, of the shaft journaled in bearings at an angle thereto, the tool-carrier pivoted in the yoke at an angle to the shaft, and the tool-carriage adjustably mounted in the carrier, substantially as described.

13. In a machine for ornamenting, substantially as described, the combination, with the chuck-shaft, of a chuck having a seat for the article in its outer face, an enlarged vacuum-chamber back of the seat, with openings from the seat into said chamber, and means for creating a vacuum in the chamber, substantially as described.

14. In a machine for ornamenting, substantially as described, the combination, with the chuck-shaft, of a chuck having a concave seat conforming to the shape of the article to be ornamented, and an enlarged vacuum-chamber back of the seat, with a series of openings between said seat and chamber, and means for creating a vacuum in the chamber, substantially as described.

15. In a machine for ornamenting, substantially such as described, the combination, with the tubular chuck-shaft having lateral openings, of the chuck thereon having the seat, with openings therein open to the shaft, the box surrounding the lateral openings, and the air-pump in communication with said box, substantially as described.

16. In a machine for ornamenting, substantially as described, the combination, with the chuck having the vacuum-chamber, of the cylinder in communication therewith, the piston in the cylinder, the handle for withdrawing the piston, and the projection for holding the piston withdrawn to maintain the vacuum, substantially as described.

17. In a machine for ornamenting curvilinear surfaces, the combination, with the chuck and tool or point carrier, substantially as described, of the tool or point consisting of the pointed tube in communication with the color reservoir, the agitating or feeding point passing into said tube, and the pulley for rotating said agitating-point, substantially as described.

18. In a machine for ornamenting curvilinear surfaces, the combination, with the chuck and tool or point carrier, substantially as described, of the reservoir on the tool-carrier, the tool consisting of the pointed tube screwing into the reservoir, the agitator passing into the tube from the rear, and means for moving said agitator, substantially as described.

19. In a machine for ornamenting curvilinear surfaces, the combination, with the work-carrier, means for rotating the work, the pivoted yoke, and the tool-carrier pivoted in the yoke, of the transverse shaft, cranks at opposite ends thereof adjustable with relation to each other around the shaft, and connections with said cranks for moving the yoke and tool-carrier, respectively, substantially as described.

20. In a machine for ornamenting curvilinear surfaces, the combination, with the work-carrier and means for rotating the work, the pivoted yoke and the tool-carrier pivoted in the yoke, of the transverse shaft, the adjustable cranks mounted thereon and adjustable around the shaft with relation to each other, and connections with said cranks for moving the yoke and tool-carrier, respectively, substantially as described.

21. In a machine for ornamenting, &c., the combination, with the chuck for rotating the work, of the tool, a carrier therefor pivotally mounted in a pivoted frame, and mechanical connections between the chuck, the frame in which the carrier is pivoted, and the carrier itself, whereby each may be given an independent movement having a certain definite relation to the movement of each of the others, substantially as described.

FRANK H. VAN HOUTEN.

Witnesses:
 ALEX. S. STEUART,
 ALVAN MACAULEY.